US010871972B2

(12) United States Patent
Song

(10) Patent No.: US 10,871,972 B2
(45) Date of Patent: Dec. 22, 2020

(54) METHOD FOR LOADING DRIVER DURING TERMINAL STARTING UP AND TERMINAL DEVICE

(71) Applicant: JRD COMMUNICATION (SHENZHEN) LTD., Shenzhen (CN)

(72) Inventor: Bin Song, Shenzhen (CN)

(73) Assignee: JRD COMMUNICATION (SHENZHEN) LTD., Shenzhen (CN)

( * ) Notice: Subject to any disclaimer, the term of this patent is extended or adjusted under 35 U.S.C. 154(b) by 0 days.

(21) Appl. No.: 16/576,800

(22) Filed: Sep. 20, 2019

(65) Prior Publication Data

US 2020/0012502 A1  Jan. 9, 2020

Related U.S. Application Data

(63) Continuation of application No. PCT/CN2018/079536, filed on Mar. 20, 2018.

(30) Foreign Application Priority Data

Mar. 21, 2017 (CN) .......................... 2017 1 0169587

(51) Int. Cl.
*G06F 9/44* (2018.01)
*G06F 9/4401* (2018.01)
(Continued)

(52) U.S. Cl.
CPC ........ *G06F 9/4411* (2013.01); *G06F 9/44505* (2013.01); *G10L 15/22* (2013.01); *G10L 2015/223* (2013.01)

(58) Field of Classification Search
CPC ..... G06F 9/4411; G06F 9/44505; G10L 15/22
See application file for complete search history.

(56) References Cited

U.S. PATENT DOCUMENTS 8,798,612 B2 * 8/2014 Satake ................ H04L 12/1859
455/419
9,672,026 B2 * 6/2017 Chen ........................ G06F 8/65
(Continued)

FOREIGN PATENT DOCUMENTS

CN         1979416 A      6/2007
CN       101980157 A      2/2011
(Continued)

OTHER PUBLICATIONS

International Search Report issued in corresponding international application No. PCT/CN/2018/079536, dated Jun. 27, 2018.
(Continued)

*Primary Examiner* — Henry Tsai
*Assistant Examiner* — Christopher A Daley

(57) ABSTRACT

The present disclosure may provide a method for loading a driver during a terminal starting up and a terminal device. The terminal includes at least one component having a driver to be loaded during starting up. The method includes: receiving a startup instruction; reading a component list; determining whether the component list comprises a driver related to a component; and if the component list includes the driver related to the component, loading the related driver. By such means, the present disclosure increases a startup speed and improves user experience.

18 Claims, 4 Drawing Sheets

(51) Int. Cl.
*G06F 9/445* (2018.01)
*G10L 15/22* (2006.01)

(56) References Cited

U.S. PATENT DOCUMENTS

| | | | |
|---|---|---|---|
| 2016/0004545 A1 | 1/2016 | Wang et al. | |
| 2016/0286591 A1* | 9/2016 | Yasaki | H04W 12/02 |
| 2018/0096281 A1* | 4/2018 | Meng | G06Q 50/30 |

FOREIGN PATENT DOCUMENTS

| | | |
|---|---|---|
| CN | 102134110 A | 9/2011 |
| CN | 102510531 A | 6/2012 |
| CN | 102945176 A | 2/2013 |
| CN | 103942078 A | 7/2014 |
| CN | 104778135 A | 7/2015 |
| CN | 104932918 A | 9/2015 |
| CN | 107145363 A | 9/2017 |

OTHER PUBLICATIONS

Chinese First Office Action and Written Opinion for related Chinese application No. 201710169587.2, dated Feb. 3, 2020 (7 pages).

* cited by examiner

METHOD FOR LOADING DRIVER DURING TERMINAL STARTING UP AND TERMINAL DEVICE

CROSS REFERENCE TO RELATED APPLICATIONS

The present application is a continuation-application of International (PCT) Patent Application No. PCT/CN2018/079536, filed on Mar. 20, 2018, which claims foreign priority of Chinese Patent Application No. 201710169587.2, filed on Mar. 21, 2017 in the National Intellectual Property Administration of China, the entire contents of which are hereby incorporated by reference in their entireties.

TECHNICAL FIELD

The present disclosure relates to the field of terminals, and in particular, to a method for loading a driver during terminal starting up and a terminal device.

BACKGROUND

In recent years, with continuous development of the intelligent terminal industry, people are increasingly demanding for intelligentization of various intelligent terminals. In one aspect, more and more functions are integrated in an existing terminal device, and such integration significantly increases internal system complexity of the terminal device. In another aspect, in order to avoid an impact on manufacture due to shortage of some components, components compatible for various types of devices may be designed. As a result, when the terminal device starts up, more time may be consumed to load drive software corresponding to the components, leading to an increase in startup time of the terminal devices, and thus significantly impacting user experience.

SUMMARY OF THE DISCLOSURE

A technical problem addressed by the present disclosure is to provide a method for loading a driver during terminal start up and a terminal device to increase a startup speed and improve user experience.

To solve the above technical problem, the present disclosure may provide a method for loading a driver during terminal starting up. The method may include: receiving a startup instruction; reading a component list; determining whether the component list includes a driver related to the component; matching the component with the related driver if the component list includes the driver related to the component; loading the related driver if matching successfully; matching the component with candidate drivers pre-stored in the terminal one by one if the component list does not include the driver related to the component; and loading a candidate driver that successfully matches with the component.

To solve the above technical problem, the present disclosure may further provide a method for loading a driver during a terminal starting up, wherein the terminal includes at least one component which has a driver to be loaded during starting up. The method includes: receiving a startup instruction; reading a component list; determining whether the component list includes a driver related to the component; and loading the related driver if the component list includes the driver elated to the component.

The loading the related driver if the component list includes the driver related to the component includes: matching the component with the related driver; and loading the related driver if matching successfully.

The loading the related driver if the component list includes the driver elated to the component further includes: matching the component with other candidate drivers pre-stored in the terminal one by one if match unsuccessfully; and loading a candidate driver that successfully matches the component.

The method further includes: matching the component with candidate drivers pre-stored in the terminal one by one if the component list does not include the driver related to the component; and loading a candidate driver that successfully matches the component.

The method further includes: relating the component with the candidate driver successfully matched with the component and storing the component into the component list.

To solve the above technical problem, the present disclosure may still further provide a terminal device, including at least one component having a driver to be loaded during a startup process. The terminal device further includes a processor, a receiver coupled to the processor, and a non-transitory memory coupled to the processor. The non-transitory memory is configured to store commands executable by the processor. The receiver is configured to receive a startup instruction. In response to the startup instruction, the processor performs following blocks: reading a component list; determining whether the component list includes a driver related to the component; and loading the related driver if the component list includes the driver related to the component.

The terminal of the present disclosure includes at least one component having a driver to be loaded during a startup process. The terminal receives a startup instruction, reads a component list, determines whether the component list includes a driver related to the component, and loads the related driver after determining that the component list includes the driver related to the component, rather than loads drivers of all components of the terminal. Therefore, the startup speed of the terminal is increased, and user experience is improved. Furthermore, the terminal of the present disclosure may directly read the component list using a stool without dismantling the terminal, which increases efficiency of after-sale services.

DETAILED DESCRIPTION

Figure 1:
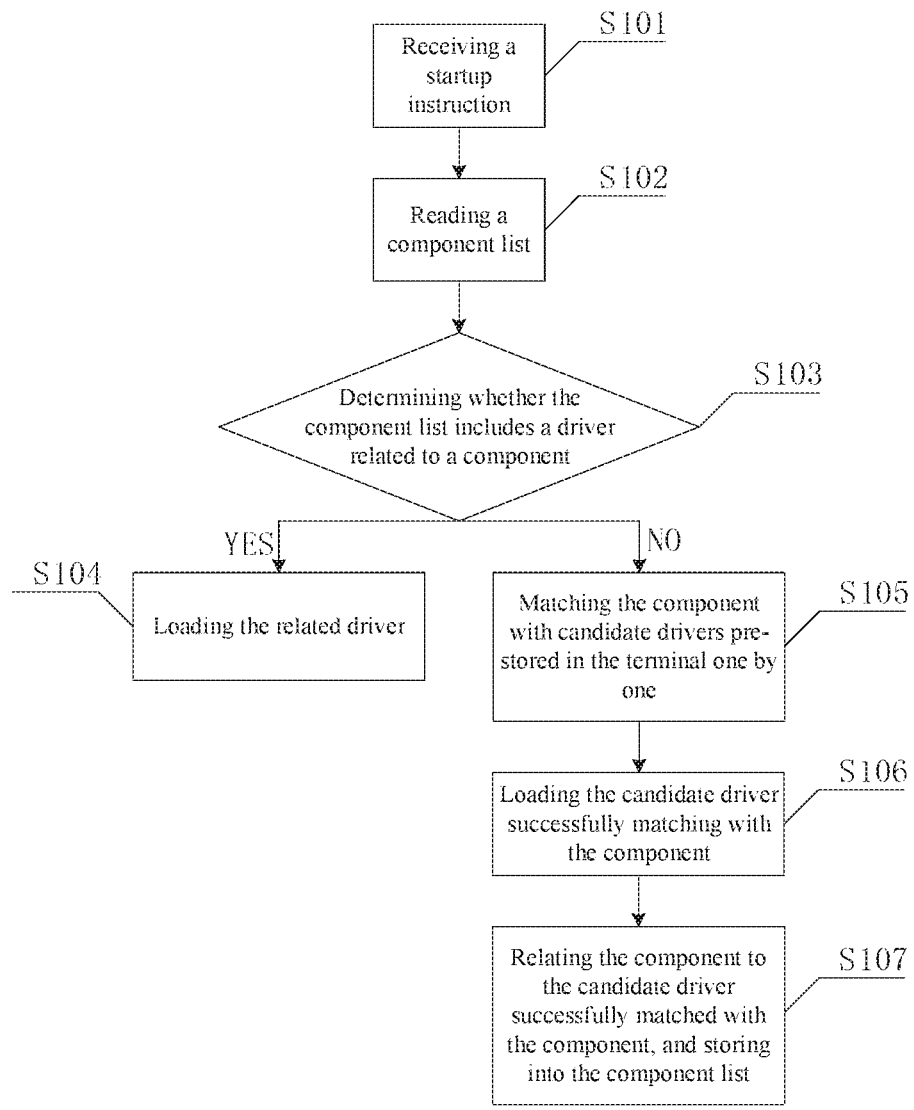
FIG. 1 is a diagram of a method for loading a driver during a startup process of a terminal according to an embodiment of the present disclosure.

Referring to FIG. 1, a diagram of a method for loading a driver during a startup process of a terminal according to an embodiment of the present disclosure is illustrated. The terminal may include at least one component having a driver to be loaded during a startup process. To be noted that, if a substantially equivalent result to be achieved, an order of performing the method provided by the present disclosure is not limited to the diagram as shown in FIG. 1. As shown in FIG. 1, the method includes following blocks.

S101: a startup instruction may be received.

The terminal device may be a smart TV, a smart TV terminal, a set-top box of a high-definition TV, a set-top box of a digital TV, a smart mobile phone, a tablet computer, a notebook computer, a Ultra-mobile Personal Computer (UMPC), a netbook, a Personal Digital Assistant (PDA), and so on.

The startup instruction may generally refer to a terminal system detecting that duration for which a user presses a power-on button of the terminal is greater than or equal to a startup threshold value of the terminal system. Alternatively, the startup threshold value of the terminal system may be a factory set or may be defined by the user. Alternatively, the startup instruction may also be a voice instruction. The terminal system may detect that a matching value between voiceprint information of the user and voiceprint information pre-stored in the terminal system is greater than or equal to a matching threshold value of the terminal system. Furthermore, the startup instruction may also be a fingerprint instruction, and the terminal system may detect that fingerprint information of the user matches fingerprint information pre-stored in the terminal system. To be noted that when the terminal starts up for the first time, the startup instruction cannot be a voice instruction and/or a fingerprint instruction. After the terminal starts up for the first time, only after the terminal system stores the user's voice information and/or fingerprint information, the user may start the terminal using the voice instruction and/or the fingerprint instruction.

S102: a component list may be read.

To be noted that, after the terminal receives the startup instruction for the first time, during starting up, there may be a performance of selecting a component from the component list for the terminal before the terminal is completely started. During the selection, the user may select a component whose driver needs to be loaded during the startup process. If the user does not select any component from the component list, the terminal system may accept factory default settings, and load drivers of all components of the terminal system.

S103: it may be determined whether the component list includes a driver related to a component.

Inclusive of a driver related to a component may specifically refer to a fact that the driver of the component is obtained by searching for a corresponding driver in a mapping table, wherein a mapping relationship between each driver and each corresponded component may be preset in the mapping table.

S104: a driver related to the component may be loaded when the component list includes the driver related to the component.

Each component in the component list has a model list. A component of each model in the model list may be driven by a corresponded driver related to the component. Alternatively, a certain type and/or several specific types of components may be driven by the driver related to the component. It may be a default setting of the terminal system or may be set by the user.

To be specific, during the startup process, components whose driver may be loaded include: a Liquid Crystal Display (LCD), a Capacitive Touch Panel (CTP), a front camera (Front_Camera), a rear camera (Back_Camera), a Gravity-sensor (Gsensor), a Magnetic Sensor (Msensor), a Proximity Sensor (Psensor), a Gyro (Gyro), a fingerprint recognizer (Fingerprint) and other Inte-Integrated Circuit devices (I2C) or Serial Peripheral interfaces (SPI), etc. Therefore, components in the component list may include a LCD, a CTP, a Front_Camera, a Back_Camera, a Gsensor, a Msensor, a Psensor, a Gyro, a Fingerprint and I2C or SPI devices, etc. To be specific, types that may support to load to drive the LCD include: ILI9881C:TXD:HSD, HX8394F:TDT:HSD, and HX8394F:CPT:EACHOPTO; types that may support to load to drive the CTP include: FT3327, MSG2840, and HX8527; types that may support to load to drive the Front_Camera include: GC2375:2M:FF, SP2509:2M:FF, OV5675:5M:FF, and GC5005:5M:FF; types that may support to load to drive the Back_Camera include: OV5675COB:5M:AF, GC5005:5M:AF, S5K4H8:8M:AF, OV8856:8M:AF, and OV13858:13M:AF; types that may support to load to drive the Gsensor include: MXC4005XC, KXTJ2-1009, mc3413-p, and BMA253; types that may support to load to drive the Msensor include: AKM09916, AKM09918, and bmc156; types that may support to load to drive the Psensor include: STK3311-W34 and EPL2570; types that may support to load to drive the Gyro include: BMGI60 and BMG250; types that may support to load to drive the Fingerprint include: GF3208, FT9339, and A112N.

In an embodiment, the LCD may be used as an example. The LCD has three types: L19881C:TXD:HSD, HX8394F:TDT:HSD, and HX8394F:CPT:EACHOPTO. The terminal system may set by default that the above three types of LCDs may be driven by a driver related to the LCD. Alternatively, the user may set that two types of LCD (ILI9881C:TXD:HSD and HX8394F:TDT:HSD) may be driven by the driver related to the LCD, but the LCD in the type of HX8394F:CPT:EACHOPTO cannot be driven by the driver related to the LCD. In this scenario, if a type of the LCD of the terminal system of the user is ILI9881C:TXD:HSD or HX8394F:TDT:HSD, during the terminal starting up, the driver of the LCD may be normally loaded. However, if the type of the LCD of the terminal system of the user is HX8394F:CPT:EACHOPTO, during the terminal starting up, the driver of the LCD cannot be loaded.

S105: the component may be matched with candidate drivers pre-stored in the terminal one by one when the component list does not include the driver related to the component.

As each component in the component list has a model list, the component may be matched with candidate driver pre-stored in the terminal one by one. That is, the driver of a certain model of the component in the model list may be matched with the candidate drivers pre-stored in the terminal one by one. If matching unsuccessfully, the terminal may skip the component and match the driver with a next component. Further, after the terminal starts up, the terminal may read a driver corresponding to the component and notify the user to determine whether the driver of the component needs to be added into the component list.

S106: a candidate driver that successfully matches with the component may be loaded.

To be specific, in an implementation, when a user's terminal device is repaired, and one of the components is replaced by another component driven by a different driver, the driver recorded in the component list of the terminal device and related to the original component cannot properly drive the replaced component. In this scenario, S104 may be skipped according to an input specific control signal (for example, touch and hold a certain button), and S105 may be directly performed. That is, after determining whether the component list includes the driver related to the component, the driver related to the component in the component list may not be loaded, and instead, the component may be directly matched with other subsequent drivers. The time for starting up may be further saved.

Including a driver related to the component may specifically refer to a fact that the driver of the component is obtained by searching for a corresponding driver in a mapping table, wherein a mapping relationship between each driver and each corresponded component is preset in the mapping table.

S107: the component may be related to a candidate driver successfully matching with the component, and storing the component into the component list.

To be specific, after the terminal starts up successfully, the terminal may relate, by default, the component with the candidate driver matching successfully and store the component into the component list. Alternatively, the terminal may also notify the user to determine whether to relate the component with the candidate driver matching successfully and store the component into the component list.

In the present implementation, the terminal may receive a startup instruction, read a component list, determines whether the component list includes a driver related to a component, and loads the related driver after determining that the component list includes the driver related to the component, rather than loads driver of all components of the terminal. Therefore, a startup speed of the terminal is increased, and user experience is improved. Furthermore, the terminal may directly read the component list using a stool without dismantling the terminal, which increases efficiency of after-sale services.

Figure 2:
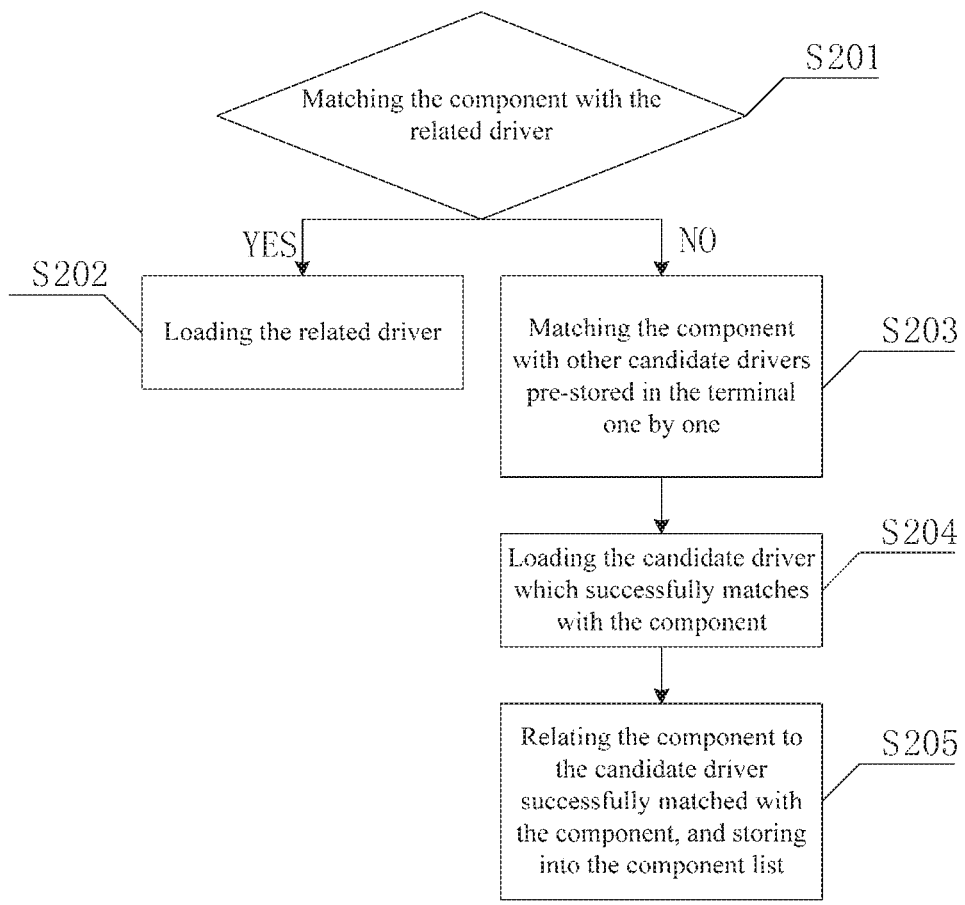
FIG. 2 is a diagram of a method for loading a driver during a startup process of a terminal according to another embodiment of the present disclosure.

Referring to FIG. 2, a flow chart of a method for loading a driver during a startup process of a terminal according to another embodiment of the present disclosure is illustrated. The present implementation may be a specific implementation of S104 of the above-mentioned embodiment. S104 of loading a driver related to the component when the component list includes the driver related to the component may include following blocks.

S201: the component may be matched with a related driver.

The driver of the component may be matched with the related driver.

To be specific, as each component in the component list has a model list, matching the component with a related driver may be matching the driver of each model of the component in the model list with the related driver. Further, if the driver of a certain model of the component in the model list is successfully matched with the related driver, the terminal may skip other models of the components in the model list and start matching of a next component.

S202: the related driver program may be loaded if match successfully.

Loading is a process of reading useful programs on a hard disk into a non-transitory memory. To be specific, loading is a process of reading a driver successfully matched with a component into the non-transitory memory of the terminal.

S203: the component may be matched with other candidate driver pre-stored in the terminal one by one if match unsuccessfully.

As described in the above S105, detailed descriptions are omitted herein.

S204: a candidate driver successfully matched with the component may be loaded.

Each component in the component list has a model list, and a driver of a component of each model in the model list may be driven by the driver related to the component. Therefore, the component may be matched with the related driver. That is, each driver of each model of the component may be matched with the related driver. To be specific, the driver of a certain model and/or several models of components may be obtained by searching for corresponding drivers in a mapping table, wherein a mapping relationship between each driver and each corresponded component may be preset in the mapping table. If a component of a certain model is not in the mapping table, the component of this model cannot be matched with a driver related to the component. After the terminal device starts up, the terminal device may notify the user to determine whether to relate the component of this model with the driver related to the component.

S205: the component may be related to a candidate driver matching successfully with the component, and the candidate driver which is successfully matched with the component may be stored into the component list.

To be specific, relating the component with a candidate driver successfully matched with the component may be a default operation performed in an internal system of the terminal, or may be a manual setting performed by the user. After the component is related to the candidate driver successfully matching with the component, storing the candidate driver into the component list may be a default operation of the terminal or a manual setting performed by the user.

Further, if a certain model in the model list of the component cannot be matched with any one of other candidate drivers pre-stored in the terminal device, the terminal may record information related to the model of this component and provide a corresponding feedback. To be specific, in a specific scenario, if the component is a LCD and a model of the LCD is D, and the driver of the LCD-D cannot be matched with any one of other candidate drivers pre-stored in the terminal, the terminal may record that the driver of the LCD of the model D cannot be matched with drivers pre-stored in the terminal. Relevant information may be provided to relevant personnel, for example, after-sale service personnel.

Further, in an implementation, the component list may be read using a special tool without dismantling the terminal device. When a component in the component list cannot match with a related driver, and cannot match with a candidate driver, relevant personnel may read the component list using a special tool.

In the present implementation, the terminal may receive a startup instruction, read a component list, determine whether the component list includes a driver related to the component, and load the related driver after determining that the component list includes the driver related to the component, rather than load drivers of all components of the terminal. Therefore, a startup speed of the terminal is increased, and user experience is improved. Furthermore, the terminal may directly read the component list using a stool without dismantling the terminal, which increases efficiency of after-sale services.

Figure 3:
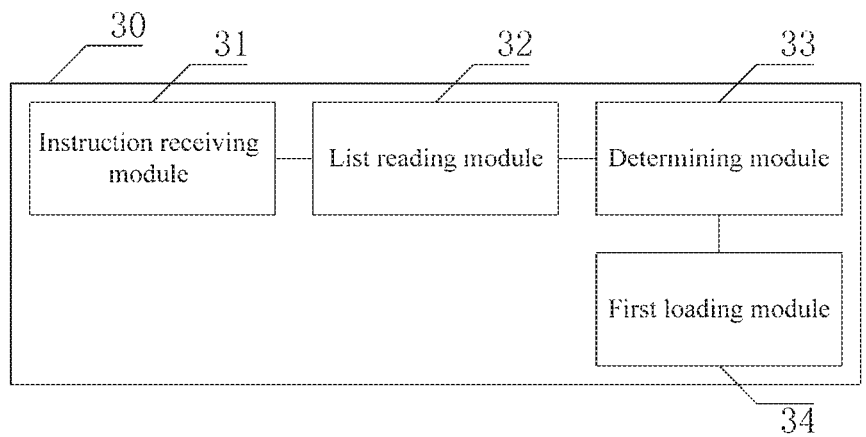
FIG. 3 is a structural diagram of a terminal device according to a first embodiment of the present disclosure.

Referring to FIG. 3, a structural diagram of a terminal device according to a first embodiment of the present disclosure is illustrated. In the present embodiment, the terminal device 30 may be the terminal device in the above embodiment, wherein the terminal device 30 may include at least one component having a driver to be loaded during starting up. The terminal device 30 may include an instruction receiving module 31, a list reading module 32, a determining module 33, and a first loading module 34.

The command receiving module 31 is configured to receive a startup instruction.

The list reading module 32 is configured to read a component list.

The determining module 33 is configured to determine whether the component list includes a driver related to the component.

The first loading module 34 is configured to load the related driver when the component list includes the driver related to the component.

Each component in the component list has a model list, and a driver of a component of each model in the model list may be driven by the driver related to this component.

In the present embodiment, the terminal may receive a startup instruction, read a component list, determine whether the component list includes a driver related to the component, and load the related driver after determining that the component list includes the driver related to the component, rather than load drivers of all components of the terminal. Therefore, a startup speed of the terminal is increased, and user experience is improved. Furthermore, the terminal may directly read the component list using a stool without dismantling the terminal, which increases efficiency of after-sale services.

Figure 4:
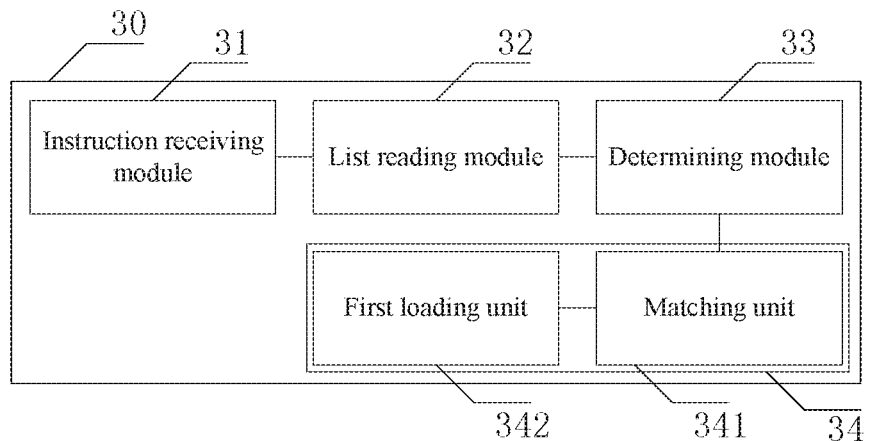
FIG. 4 is a structural diagram of a terminal device according to a second embodiment of the present disclosure.

Referring to FIG. 4, a structural diagram of a terminal device according to a second embodiment of the present disclosure is illustrated. Different from the previous embodiment, the first loading module 34 of the terminal device 30 of the present embodiment includes a matching unit 341 and a first loading unit 342.

The matching unit 341 is configured to match the component with the related driver.

The first loading unit 342 is configured to load the related driver if matching successfully.

Figure 5:
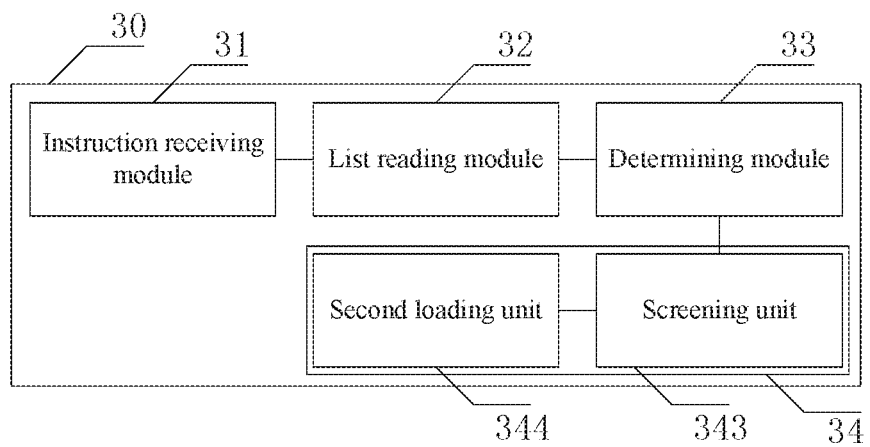
FIG. 5 is a structural diagram of a terminal device according to a third embodiment of the present disclosure.

Referring to FIG. 5, a structural diagram of a terminal device according to a third embodiment of the present disclosure is illustrated. Different from the previous embodiment, the first loading module 34 of the terminal device 30 of the present embodiment further includes a screening unit 343 and a second loading unit 344.

The screening unit 343 is configured to match the component with other candidate drivers pre-stored in the terminal one by one if matching unsuccessfully.

The second loading unit 344 is configured to load a candidate driver successfully matching with the component.

Figure 6:
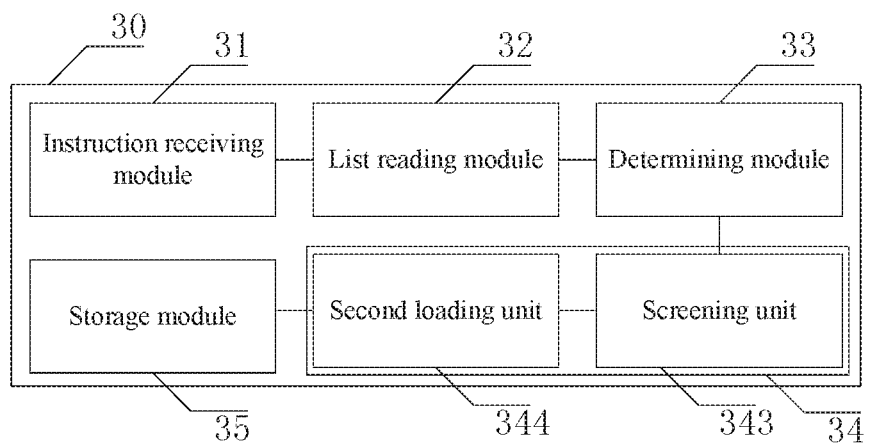
FIG. 6 is a structural diagram of a terminal device according to a fourth embodiment of the present disclosure.

Referring to FIG. 6, a structural diagram of a terminal device according to a fourth embodiment of the present disclosure is illustrated. Different from the previous embodiment, the terminal device 30 of the present embodiment further includes a storage module 35.

The storage module 35 is configured to relate the component to the candidate driver successfully matching with the component and store the component into the component list.

Figure 7:
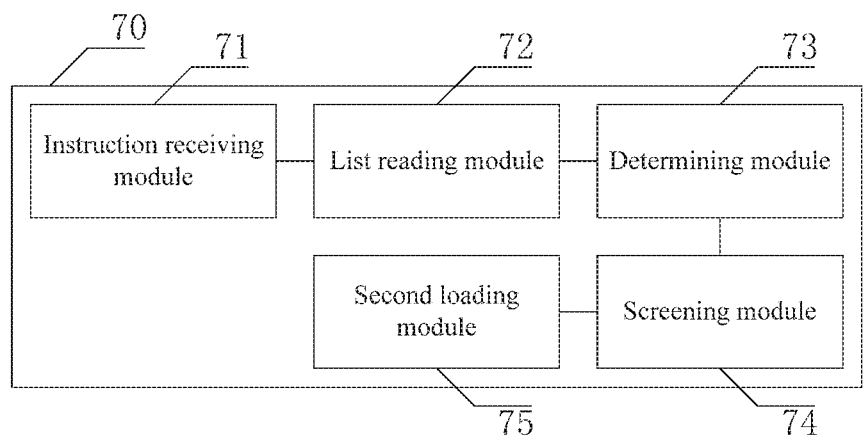
FIG. 7 is a structural diagram of a terminal device according to a fifth embodiment of the present disclosure.

Referring to FIG. 7, a structural diagram of a terminal device according to a fifth embodiment of the present disclosure is illustrated. Different from the previous embodiment, a terminal device 70 of the present embodiment includes an instruction receiving module 71, a list reading module 72, a determining module 73, a screening unit 74, and a second loading module 75.

The instruction receiving module 71 is configured to receive a startup instruction.

The list reading module 72 is configured to read a component list.

The determining module 73 is configured to determine whether the component list includes a driver related to the component.

The screening unit 74 is configured to match the component with candidate drivers pre-stored in the terminal one by one if the component list does not include the driver related to the component.

The second loading unit 75 is configured to load a candidate driver that successfully matches the component.

Figure 8:
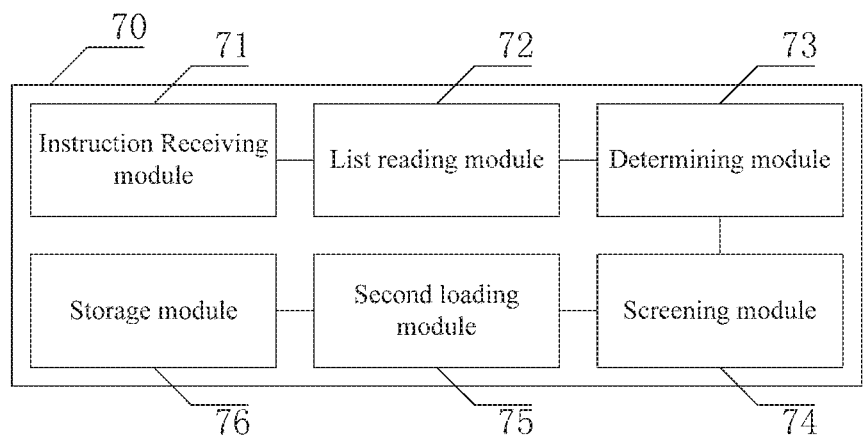
FIG. 8 is a structural diagram of a terminal device according to a sixth embodiment of the present disclosure.

Referring to FIG. 8, a structural diagram of a terminal device according to a sixth embodiment of the present disclosure is illustrated. Different from the previous embodiment, the terminal device 70 of the present embodiment further includes a storage module 76.

The storage module 76 is configured to relate the component to the candidate driver successfully matching with the component and store the component into the component list.

Each module of the above communication terminal 30/70 may respectively perform the blocks corresponding to the above method embodiments, and thus detailed descriptions of these modules are omitted herein because the above descriptions of corresponding blocks may serve as a reference.

In the present embodiment, the terminal may receive a startup instruction, read a component list, determines whether the component list includes a driver related to the component, and load the related driver after determining that the component list includes the driver related to the component, rather than load drivers of all components of the terminal. Therefore, a startup speed of the terminal is increased, and user experience is improved. Furthermore, the terminal may directly read the component list using a stool without dismantling the terminal, which increases efficiency of after-sale services.

Figure 9:
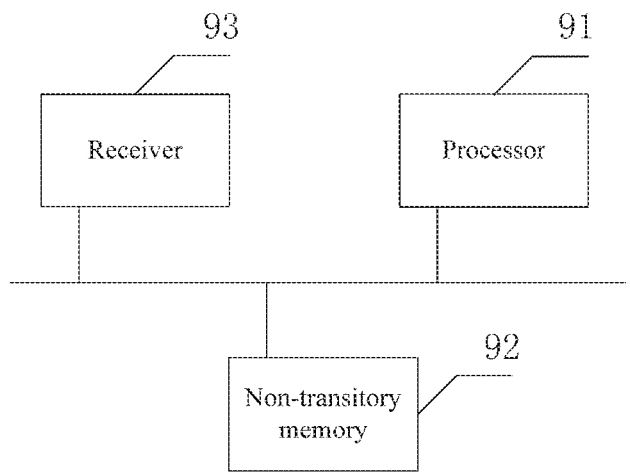
FIG. 9 is a structural diagram of a terminal device according to a seventh embodiment of the present disclosure.

Referring to FIG. 9, a structural diagram of a terminal device according to a seventh embodiment of the present disclosure is illustrated. The terminal device may perform the blocks performed by the terminal device in the foregoing method, reference is made to detailed descriptions of the foregoing method for related contents, and thus detailed descriptions thereof are omitted herein.

In the present embodiment, the processing device 90 may include a processor 91, a memory 92 coupled to the processor 91, and a receiver 93 coupled to the processor 91. The terminal 90 includes at least one component having a driver to be loaded during starting up.

The memory 92 is configured to store instructions and received messages, wherein the instructions may be executed by an operating system and the processor 91.

The receiver 93 is configured to receive a startup instruction.

The processor 91 is configured to read a component list, determine whether the component list includes a driver related to a component, and loads the related driver if the component list includes the driver related to the component.

The processor 91 is further configured to match the component with the related driver, and load the related driver if matching successfully.

Alternatively, the processor 91 is further configured to match the component with other candidate driver pre-stored in the terminal one by one if match unsuccessfully, and load a candidate driver that successfully matches with the component.

Alternatively, the processor 91 is further configured to match the component with candidate driver pre-stored in the terminal one by one if the component list does not include the driver related to the component, and load a candidate driver that successfully matches with the component.

Further, the processor 91 is also configured to relate the component to the candidate driver successfully matching with the component and store the component into the component list.

In the present embodiment, the terminal may receive a startup instruction, read a component list, determines whether the component list includes a driver related to the component, and load the related driver after determining that the component list includes the driver related to the component, rather than load drivers of all components of the terminal. Therefore, a startup speed of the terminal is increased, and user experience is improved. Furthermore, the terminal may directly read the component list using a stool without dismantling the terminal, which increases efficiency of after-sale services.

The above are merely embodiments of the present disclosure and are not intended to limit the scope of the present disclosure. Any modifications of equivalent structures or equivalent processes made on the basis of the contents of the description and accompanying drawings of the present disclosure or directly or indirectly applied to other related technical fields shall similarly fall within the scope of the present disclosure.

What is claimed is:

1. A method for loading a driver during a terminal starting up, wherein the terminal comprises at least one component during starting up, the method comprising:
   receiving a startup instruction;
   reading a component list;
   determining whether the component list comprises a driver related to a component;
   matching the component with a related driver when the component list comprises the driver related to the component;
   loading the driver related to the component when matching successfully;
   matching the component with candidate drivers pre-stored in the terminal sequentially when the component does not match with any driver in the component list, wherein the candidate drivers are not stored in the component list; and
   loading a candidate driver which is successfully matched with the component.

2. The method according to claim 1 further comprising:
   relating the component to the candidate driver successfully matched with the component and storing the candidate driver into the component list.

3. A method for loading a driver during a terminal starting up, wherein the terminal comprises at least one component during starting up, the method comprising:
   receiving a startup instruction;
   reading a component list;
   determining whether the component list comprises a driver related to a component; and
   loading the related driver when the component list comprises the driver related to the component;
   matching the component with candidate drivers pre-stored in the terminal sequentially when the component does not match with any driver in the component list, wherein the candidate drivers are not stored in the component list; and
   loading a candidate driver which is successfully matched with the component.

4. The method according to claim 3, wherein the loading the related driver when the component list comprises the driver related to the component comprises:
   matching the component with the related driver; and
   loading the related driver when matching successfully.

5. The method according to claim 3 further comprising:
   relating the component to the candidate driver successfully matched with the component and storing the candidate driver into the component list.

6. The method according to claim 3 further comprising:
   relating the component with the candidate driver successfully matched with the component and storing the candidate driver into the component list.

7. The method according to claim 3, wherein the startup instruction is an instruction generated when the terminal detects that duration for which a user presses a power button of the terminal is greater than or equal to a startup threshold value of the terminal.

8. The method according to claim 3, wherein
   the startup instruction is a voice instruction; and
   the startup instruction is an instruction generated when the terminal detects that a matching value between voiceprint information of a user and voiceprint information pre-stored in the terminal is greater than or equal to a matching threshold value of the terminal.

9. The method according to claim 3, wherein
   the startup instruction is a fingerprint instruction; and
   the startup instruction is an instruction generated when the terminal detects that fingerprint information of a user matches with fingerprint information pre-stored in the terminal.

10. The method according to claim 3, wherein the component is any one of a liquid crystal display, a front camera, a rear camera, a sensor, a capacitive touch panel, and a serial peripheral interface.

11. The method according to claim 3, wherein after the terminal starts up, the method comprises:
    reading, by the terminal, a driver corresponding to the component; and
    notifying, by the terminal, a user to determine whether the driver of the component needs to be added into the component list.

12. The method according to claim 3, wherein after the terminal starts up, the method comprises:
    relating, by the terminal, the component with the candidate driver matching successfully; and
    storing, by the terminal, the candidate component into the component list.

13. A terminal device, comprising at least one component during the terminal device starting up, and further comprising a processor, a receiver coupled to the processor, and a memory coupled to the processor, wherein
    the memory is configured to store instructions executable by the processor;
    the receiver is configured to receive a startup instruction; and
    the processor, in response to the startup instruction, is configured to:
    read a component list;

determine whether the component list comprises a driver related to a component;

load the related driver when the component list comprises the driver related to the component;

match the component with candidate drivers pre-stored in the terminal sequentially when the component does not match with any driver in the component list, wherein the candidate drivers are not stored in the component list; and load a candidate driver which is successfully matched with the component.

14. The terminal device according to claim 13, wherein the processor, in response to the power-on command, is configured to load the related driver when the component list comprises the driver related to the component comprises:

the processor being configured to match the component with the related driver and load the related driver when match successfully.

15. The terminal device according to claim 13, wherein the processor is further configured to relate the component to the candidate driver successfully matched with the component and storing the candidate driver into the component list.

16. The terminal device according to claim 13, wherein the processor is further configured to relate the component to the candidate driver successfully matched with the component and store the component into the component list.

17. The terminal device according to claim 13, wherein the component is any one of a liquid crystal display, a front camera, a rear camera, a sensor, a capacitive touch panel, and a serial peripheral interface.

18. The terminal device according to claim 13, wherein the terminal device is any one of a smart television, a TV set-top box, a smart mobile phone, a tablet computer, and a notebook computer.

* * * * *